United States Patent Office 3,723,166
Patented Mar. 27, 1973

3,723,166
UNSATURATED GRADED-RUBBER AND VINYL
MONOMER PAINT
Olin B. Johnson, 27406 Vargo, Livonia, Mich. 48152,
and Santokh S. Labana, 657 Cronin Drive, Dearborn
Heights, Mich. 48127
No Drawing. Filed Dec. 21, 1970, Ser. No. 100,390
Int. Cl. C08g 45/04
U.S. Cl. 117—93.31
10 Claims

ABSTRACT OF THE DISCLOSURE

A radiation-curable paint which on a pigment and particulate filler-free basis consists essentially of vinyl monomers and particulate graded-rubber having alpha-beta olefinic-unsaturation surface functionality. The coating is applied as a film-forming dispersion to the surface of a substrate and cured thereon by ionizing radiation, e.g., an electron beam. This application is further directed to articles of manufacture coated with this paint using this process of curing.

THE INVENTION

A radiation-curable coating material of unique characteristics is provided by homogenously dispersing about 10 to about 70 parts by weight of graded-rubber particles having alpha-beta olefinic-unsaturation surface functionality within about 90 to about 30 parts by weight vinyl monomers. The dispersion is applied as a paint film to substrates of wood, metal, glass, and polymeric solid and cured thereon by ionizing radiation, preferably an electron beam having average energy in the range of about 100,000 to about 500,000 electron volts. This invention is further directed to the coated articles of manufacture prepared from this coating material by this process. The film-forming constituents of the dispersion are hereinafter described in greater detail.

Preparation of the graded-rubber particle

The graded-rubber particle has a core of crosslinked, elastomeric, acrylic polymer, an outer shell comprising methyl methacrylate and an epoxy functional acrylate and an intermediate layer which is a copolymer of the monomers used to form the core and the monomers used to form the outer shell.

The process for preparing these particulate materials is at least a two-stage process. In one method of preparation, a major amount of mono-functional monoacrylate is emulsion copolymerized in the first stage with a crosslinking amount of a di- or tri-functional monomer containing two or more nonconjugated terminal ethylenic groups, preferably a diacrylate, using a water-soluble free radical initiator and a suitable surfactant to yield a latex of relatively uniform particle size, e.g., .04 to 1 micron average diameter. Before this reaction reaches substantial completion, i.e., when the reaction is between about 50 and about 90, preferably between about 70 and about 89, percent complete, the second stage monomeric component, i.e., a mixture of about 65 to about 98, preferably about 70 to about 95, mole percent methyl methacrylate, and about 2 to about 35, preferably about 5 to about 30 mole percent of an epoxy acrylate, e.g. glycidyl methacrylate, or about 2 to about 35 mole percent of the epoxy acrylate and about 65 to about 98 mole percent of a monomer mixture selected from and consisting essentially of esters of acrylic or methacrylic acid and a $C_1$–$C_8$ monohydric alcohol, monovinyl hydrocarbons, diacrylates and divinyl hydrocarbons, is added slowly to the reaction mixture. The polymerization process is continued to yield a stable latex of relatively uniform particle size and composition. A surfactant is used in forming the emulsion and additional surfactant may be added simultaneously with the second stage monomeric component. Alpha-beta olefinic unsaturation is introduced by reacting the epoxy groups provided by the epoxyacrylate with an alpha-beta olefinically unsaturated monocarboxylic acid, e.g. acrylic acid, methacrylic acid, etc.

It is also possible to produce such materials by reversing the process, i.e., incorporating the acrylic or methacrylic acid into the shell and reacting the carboxyl groups with an epoxy acrylate, but this is more difficult and less satisfactory.

The latex is coagulated, washed and dried to yield a finely divided white powder suitable for use in this invention. Generally, the particles are prepared from monomers that will provide a crosslinked acrylic, rubber-like core and a glass-like polymeric outer shell at room temperature, e.g., 20°–30° C. The terms rubber-like and glass-like are, of course, meaningless except when used in reference to a specific temperature or temperature range. The particles should be formulated so that the core retains its rubber-like properties and the outer shell retains its glass-like properties at temperatures encountered by articles of commerce in the intended field of use. Hence, for practical purposes, the monomers should be selected so that the core has a glass transition temperature that is substantially below that of the outer shell. Advantageously, the difference in glass transition temperature between the core and the shell is at least 50° C., preferably above 100° C.

The core is formed from a major amount of an alkyl, monofunctional, monoacrylate and a crosslinking amount of a di- or tri-functional monomer containing 2 or more non-conjugated terminal ethylenic groups. The monofunctional, alkyl, monoacrylate is preferably an ester of a $C_2$–$C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are too high to provide rubber-like properties at normally encountered temperatures. Hence, except for special use applications, the monoacrylate component of the core will be either an ester (or esters) of acrylic acid or a mixture of a major amount of the same and a minor amount of methacrylate.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylolethane triacrylate, 1,1,1-trimethylolethane trimethacrylate, 1,1,1 - trimethylolpropane triacrylate, 1,1,1-trimethylolpropane trimethacrylate, 1,4-dimethylolcyclohexane dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol. In another embodiment, the crosslinking agent is a triester of acrylic or methacrylic acid and a $C_2$–$C_8$, preferably $C_2$–$C_6$, trihydric alcohol.

In the first reaction stage, there is preferably employed about 80 to about 98 mole percent of a monofunctional, monoacrylate and about 20 to about 2 mole percent of the crosslinking agent.

In the second stage reaction, it is preferred to use a mixture of about 65 to about 99, preferably about 70 to about 95 percent methyl methacrylate and about 1 to about 35, preferably about 5 to about 30, mole percent of hydroxyalkyl acrylate. These are added before the first reaction ceases. The amounts of the second stage reactants relative to the combined first stage reactants may vary widely depending upon the physical properties desired in the final product, i.e., from about 10 to about 90 to about 90 to about 10 weight percent.

The methyl methacrylate concentration in the outer shell is advisedly at least about 30 mole percent with the balance of the monofunctional component being made up of monofunctional monoacrylates, e.g., esters of $C_2$–$C_8$ monohydric alcohols and either acrylic or methacrylic acid, or monofunctional vinyl hydrocarbons such as styrene and methyl substituted styrenes, e.g. alpha methyl styrene. It will also be advantageous at times to have a limited amount of crosslinking in the outer shell and hence to include in said "balance" a minor amount of a diacrylate, e.g., 1 to 30 mole percent of a diester of acrylic or methacrylic acid and a $C_2$–$C_6$ dihydric alcohol, or divinyl hydrocarbon, e.g., 1 to 30 mole percent of divinyl benene. The physical properties of the outer shell may also be modified by replacing up to about 30 mole percent of the methyl methacrylate with acrylonitrile or methacrylonitrile.

The initial monomer charge is usually emulsified by one or more micelle-forming compounds composed of a hypdrophobic part, such as a hydrocarbon group containing 8 or more carbon atoms, and a hydrophilic part, such as alkaline metal or ammonium carboxylate groups, phosphate or sulfate partial ester groups, sulfonate groups, and the like. Exemplary emulsifying agents include alkali metal sulfonates of styrene, naphthalene, decyl benene and dodecyl benzene; sodium dodecyl sulfate; sodium stearate, sodium oleate; sodium alkyl aryl sulfonate; polyoxyethylene sulfates and phosphates; the ethylene oxide condensate with long chain fatty acids, alcohols, and mercaptans and the alkali metal salts of rosin acids. These materials and techniques of employment of emulsion formation and maintenance are well known to the art and have no unusual application here. As they are conventional materials employed in a conventional manner, further description is unnecessary.

The polymerization initiator is composed of one or more water-soluble, free-radical-generating species such as hydrogen peroxide or sodium, potassium, or ammonium persulfates, perborates, peracetates, percarbonates and the like. As is well known in the art, these initiators may be associated with activating systems such as redox systems which may incorporate mild reducing agents such as sulfites and thiosulfites and redox reaction promotors such as transition metal ions.

A chain transfer agent or a mixture of chain transfer agents may be added to the reaction medium to limit the molecular weight of the polymer. Such chain transfer agents are generally mercaptans such as dodecane thiol, pentane thiol, and butane thiol.

Those skilled in the art will be aware that other emulsifying agents, polymerization initiators and chain transfer agents may be used when compatible with the polymerization system herein employed.

The reacton may be carried out at temperatures from about 40° C. to about 80° C., or at lower temperatures, as from 0° C. to 80° C. in the case of activated systems.

The graded-rubber particles above described and this method of preparation are disclosed by Ray A. Dickie and Seymour Newman in their patent application Ser. No. 100,464 filed of even date with this application.

The rubber particles can also be formed in an aliphatic hydrocarbon medium.

Vinyl monomers employed in the paint dispersion

The paint binder dispersion advantageously contains about 30 to about 90, preferably about 25 to about 75, weight percent vinyl monomers and about 10 to about 70, preferably about 25 to about 75, weight percent of the graded-rubber particles.

Monomer type and concentration provide one means for adjusting the viscosity of the paint dispersion to conform to the methods of application desired, e.g., spray coating, roll coating, etc. In functional terms, the amount of vinyl monomer present is at least sufficient to convert the graded-rubber particles into a crosslinked continuous coating on the surface of a substrate when a film of such coating dispersion is exposed to ionizing radiation, e.g., electron beam.

Vinyl monomers employed may be monofunctional, monoacrylates formed by the esterification of acrylic or methacrylic acid and a $C_1$–$C_8$, preferably a $C_1$–$C_6$, monohydric alcohol, e.g., methyl methacrylate, ethyl acrylate, butyl acrylate, butyl methacrylate, 2-ethyl hexyl acrylate, etc. The monomer mixture may also include a minor amount, e.g., 1 to 30 mole percent, of diacrylates e.g., the diesters of acrylic or methacrylic acid and a $C_2$–$C_8$ diol such as 1,3-butylene diacrylate, 1,3-butylene dimethacrylate, 1,6-hexamethylene diacrylate, 1,6-hexamethylene dimethacrylate, ethylene glycol dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1$–$C_8$ monohydric alcohol and acrylic or methacrylic acid and/or monovinyl hydrocarbons having about 8 to about 9 carbon atoms. Frequently, it is advantageous to use a mixture of about 40 to about 60 mole percent of these monoacrylates and about 60 to about 40 mole percent of these monovinyl hydrocarbons.

Preparation and application of the coating dispersion to a substrate

By adjusting the viscosity of the coating dispersion to a viscosity compatible with the desired method of coating, these coatings may be applied by any of the conventional metrods, e.g. brushing, spraying, roll coating, curtain coating, flow coating, etc.

The viscosity may be regulated by varying the relative concentration of the particles with respect to the vinyl monomer component and/or by varying the relative concentrations of dissimilar monomers within the vinyl monomer component. The binder dispersion may be applied to the substrate essentially free of non-polymerizable, organic solvents and/or diluents or it may be applied with the solvent and/or diluents in a method of application wherein the solvents and/or diluents are flashed off prior to polymerization.

Coatings may be applied to any substrate, e.g., metal, wood, glass, polymeric solids, etc. These coatings will ordinarily be applied to an average depth in the range of about 0.1 to about 4 mils, more commonly about 0.5 to about 2 mils.

Curing the coatings

Films formed of the paints of this invention can be cured with ionizing radiation at relatively low temperatures, e.g., room temperature (20° to 25° C.) or a temperature between room temperature and that temperature at which significant varporization of its most volatile component is initiated, ordinarily between 20° C. and 75° C. The radiation energy is applied at dose rates of about 0.1 to about 100 Mrad per second on a workpiece, preferably a moving workpiece, with the coating receiving a total dose in the range of about 1 to about 25, commonly about 8 to about 15 Mrad.

The term "ionizing radiation" as employed herein means radiation having sufficient energy to remove an electron from a gas atom, forming an ion, hence radiation with minimum energy of, or equivalent to, at least about 5,000 electron volts except when the curing is carried out in a vacuum. The preferred method of curing films of the instant paint binders on the substrates to which they have been applied is by subjecting such films to a beam of polymerization effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder, which is ultimately converted to a durable film resistant to wear, weather, etc. can be all or virtually all that is used to form the film or it can be a vehicle for pigmentary and/or mineral filler material.

The abbreviation "Mrad" as employed herein means one million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passed through a metal window, e.g., aluminum, aluminum-copper alloy, or magnesium-thorium alloy of about 0.003 inch thickness. This invention will be more fully understood from the following examples:

This invention will be more fully understood from the following examples which illustrate the invention hereinbefore described and hereinafter claimed.

EXAMPLE 1

A radiation-curable paint is prepared in the following manner:

To 1,000 parts by weight water which has been boiled and cooled to room temperature under a nitrogen atmosphere are added 2.86 parts by weight sodium dodecyl sulfate dissolved in 35.7 parts by weight water and about ⅛ of a monomer mixture consisting of 348 parts by weight butyl acrylate and 32.3 parts by weight 1,3-butylene dimethacrylate. The mixture is stirred to establish dispersion of the monomers. To the stirred mixture are added 3.14 parts by weight potassium persulfate dissolved in 71.4 parts by weight water. The mixture is heated to 45° C. After about 10 minutes, addition of the remainder of the first monomer mixture is begun at a rate such that the temperature of the reaction mixture is maintained at 47° to 49° C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of (1) a mixture of 236 parts by weight methyl methacrylate, 143.4 parts by weight glycidyl methacrylate, and 2.57 parts by weight 1-dodecanethiol, and (2) a solution of 5.72 parts by weight sodium dodecyl sulfate in 35.7 parts by weight water. This addition, which required about 40 minutes, is carried out at such a rate that the temperature of the reaction mixture is maintained at 47 to 49° C. Following this addition, the mixture is maintained at 47 to 49° C. for an additional two hours. The resulting latex, known hereinafter as Latex A, is cooled to room temperature. The overall conversion of monomers is about 98%.

Latex A is coagulated by adding one volume of latex to approximately 4 volumes of methyl alcohol to which has been added 0.001 volume concentrated hydrochloric acid. The coagulum is isolated by filtration, washed with several volumes of methyl alcohol, and with water, and is dried in vacuo to yield Powder A.

Twenty parts by weight of Powder A are dispersed in 200 parts by weight unpurified commercial styrene monomer. To this dispersion is added methacrylic acid in an amount providing about one carboxyl group per each epoxy group in the outer shells of the rubber particles and a catalytic amount (0.1 part by weight based on methacrylic acid) benzyl triethyl ammonium chloride. The dispersion is heated until the reaction between the methacrylic acid and the epoxy groups on the graded elastomeric particles is at least 50% complete.

The styrene and unreacted methacrylic acid, if any, are removed from the dispersion by vacuum distillation.

The resultant particles are divided into five equal parts by weight. Dispersion A is formed by thoroughly mixing one part by weight of the particles with one part by weight of methyl methacrylate. Dispersion B is formed by thoroughly mixing one part by weight of the particles with 4 parts by weight of methyl methacrylate. Dispersion C is formed by thoroughly mixing one part by weight of the particles with 6 parts by weight of methyl methacrylate. Dispersion D is formed by thoroughly mixing one part by weight of the particles with 9 parts by weight of methyl methacrylate. Dispersion E is formed by thoroughly mixing one part by weight of the particles with 4 parts by weight of methyl methacrylate and 3 parts of 2-hydroxyethyl acrylate.

The dispersions A through E inclusive are separately applied as paint films to substrates and cured thereon by ionizing radiation provided by an electron beam. Each of the dispersions are applied to a variety of substrates, i.e., wood, steel, glass and shaped polymeric solid (acrylonitrile-butadiene-styrene copolymer). The conditions of irradiation employed are as follows:

Potential: 275 kv.
Current: 30 ma.
Distance, emitter from workpiece: 10 in.
Atmosphere: nitrogen
Dose: 10–15 Mrad.

EXAMPLE 2

The procedure of Example 1 is repeated with the difference that an equimolar mixture of methyl methacrylate and styrene are used in lieu of the methyl methacrylate monomer in the paint.

EXAMPLE 3

The procedure of Example 1 is repeated with the difference that a monomer mixture consisting of 50 mole percent methyl methacrylate, 20 mole percent ethyl acrylate, 10 mole percent butyl methacrylate and 10 mole percent 2-ethyl hexyl acrylate are substituted for the methyl methacrylate monomer in the paint.

EXAMPLE 4

The procedure of Example 1 is repeated with the difference that a monomer mixture consisting of 30 mole percent methyl methacrylate, 20 mole percent alpha methyl styrene, 10 mole percent vinyl toluene, 10 mole percent butyl acrylate, 10 mole percent divinyl benzene and 20 mole percent 1,3-butylene dimethacrylate.

EXAMPLE 5

To 1000 parts by weight water which has been boiled and cooled to room temperature under a nitrogen atmosphere are added 2.86 parts by weight sodium dodecyl sulfate dissolved in 35.7 parts by weight water and about ⅑ of a monomer mixture consisting of 521 parts butyl acrylate and 48.5 parts by weight of 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is begun at a rate such that the temperature of the reaction mixture is maintained at 47° to 50° C. During the addition of the last two-thirds of the first monomer mixture, 5.72 parts by weight sodium dodecyl sulfate dissolved in 35.7 parts by weight water are added at a substantially constant rate. The reaction mixture is maintained at 47° to 50° for about 40 minutes prior to beginning simultaneous dropwise addition of (1) 190 parts by weight of a monomer mixture consisting of methyl methacrylate, styrene, and glycidyl methacrylate present in mole rate 35:35:30, and (2) 2.86 parts by weight sodium dodecyl sulfate dissolved in 35.7 parts by weight water. This addition is carried out at such a rate that the mixture is maintained at 47° to 50° C. Following this addition, the temperature is held at 47° to 50° C. for an additional two hours. The resulting latex as Latex B, is cooled to room temperature.

A portion of Latex B is coagulated by adding one volume of latex rapidly but dropwise to approximately four volumes of rapidly stirred methyl alcohol which has been heated to about 60° C. before beginning the coagulation. The resulting coagulum is filtered, washed, and dried in vacuo to yield a white powder hereinafter known as Powder B.

Twenty parts by weight of Powder B are dispersed in 500 parts by weight unpurified commercial styrene monomer. To this dispersion is added methacrylic acid in an amount providing about one carboxyl group per each epoxy group in the outer shells of the rubber particles and a catalytic amount (0.05 part by weight based on methacrylic acid) benzyltriethylammonium chloride. The dispersion is heated until the reaction between the methacrylic acid and the epoxy groups on the graded elastomeric particles is above 50% complete.

About 9/10 of the styrene is removed by vacuum distillation and the remaining dispersion is applied to substrates and cured by exposure to an electron beam as in the previous examples.

EXAMPLE 6

The procedure of Example 5 is repeated except for the difference that the electron beam has an average energy of about 250,000 electron volts and the atmosphere for irradiation is helium.

EXAMPLE 7

The procedure of Example 5 is repeated except for the difference that the electron beam has average energy of about 325,000 electron volts and the atmosphere for irradiation is a major amount of nitrogen and a minor amount of carbon dioxide.

EXAMPLE 8

The procedure of Example 5 is repeated except for the difference that the cores of the graded-rubber particles are formed from about 85 mole percent butyl acrylate and about 15 mole percent divinyl benzene.

EXAMPLE 9

The procedure of Example 5 is repeated except for the difference that the cores of the graded-rubber particles are formed from about 85 mole percent butyl acrylate and about 15 mole percent divinyl benzene.

EXAMPLE 10

The procedure of Example 5 is repeated except for the difference that the cores of the graded-rubber particles are formed from about 90 mole percent 2-ethyl hexyl acrylate and 10 mole percent 1,1,1-trimethylolpropane trimethacrylate.

EXAMPLE 11

The procedure of Example 5 is repeated except for the difference that the cores of the graded-rubber particles are formed from 90 mole percent ethyl acrylate and about 10 mole percent 1,3-butylene diacrylate.

EXAMPLE 12

The procedure of Example 5 is repeated except for the difference that the outer shells of the graded-rubber particles are formed from a monomer mixture consisting of 30 mole percent methyl methacrylate, 20 mole percent styrene, 10 mole percent butyl methacrylate, 10 mole percent 2-ethyl hexyl acrylate and 30 mole percent glycidyl methacrylate.

EXAMPLE 13

The procedure of Example 5 is repeated except for the difference that the outer shells of the graded-rubber particles are formed from a monomer mixture consisting of 80 mole percent methyl methacrylate, 5 mole percent 1,3-butylene dimethacrylate, and 15 mole percent glycidyl acrylate. The glycidyl acrylate and an equimolar amount of the methyl methacrylate are added to the reaction mixture after the polymerization of the remaining methyl methacrylate is substantially complete.

EXAMPLE 14

The procedure of Example 5 is repeated except for the difference that the outer shells of the graded-rubber particles are formed from a monomer mixture consisting of about 40 mole percent methyl methacrylate, 10 mole percent alpha ethyl styrene, 10 mole percent vinyl toluene, 5 mole percent methacrylonitrile, 5 mole percent acrylonitrile, 5 mole percent vinyl acetate, 5 mole percent divinyl benzene, 5 mole percent 1,3-butylene diacrylate, and 15 mole percent glycidyl methacrylate. The glycidyl methacrylate and half of the methyl methacrylate are separated. The other monomers are mixed and added to the reaction mixture. When their reaction is substantially complete, the glycidyl methacrylate and the remainder of the methyl methacrylate are added dropwise to the reaction mixture.

The determination of the concentration of the reactive epoxy groups on the shell of the graded-rubber particles is made by the method involving addition of tetraethylammonium bromide followed by titration with perchloric acid in acetic acid using crystal violet as indicator. This method is described by R. R. Jay in Analytical Chemistry, vol. 36, page 667 (1964).

The particles having alpha-beta olefinic-unsaturation surface functionality can also be used to form a paint with any alpha-beta olefinically unsaturated resin, e.g., the alpha-beta olefinically unsaturated resins disclosed in U.S. Pats. 3,437,512; 3,437,513; 3,437,514; 3,509,234 and 3,528,844. Another unsaturated resin that can be used in these paints can be prepared by preparing a carboxy-functional, graded-rubber particle by incorporating acrylic or methacrylic acid (or other alpha-beta olefinically unsaturated monocarboxylic acid) in the shell and then reacting the resultant carboxy-functional particles with a alkyl acrylate. The monohydroxy alkyl acrylate can be prepared by reacting acrylic or methacrylic acid with a diol, i.e., a monomeric glycol such as ethylene glycol, propylene glycol, neopentyl glycol, etc., or a polymeric glycol such as polyethylene glycol or polypropylene glycol.

The terms "acrylate" and "acrylates," when used herein without a modifier distinguishing between esters of acrylic acid and methacrylic acid, shall be understood to include both. This, of course, does not apply to a naming of a specific compound.

It will be understood by those skilled in the art that modifications can be made within the foregoing examples in the scope of this invention as hereinbefore described and hereinafter claimed.

We claim:

1. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 30 to about 90 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 10 to about 70 weight percent of graded-rubber particles having alpha-beta, olefinic, unsaturation surface functionality, said particles consisting essentially of
   (1) about 10 to about 90 weight percent of a core of crosslinked acrylic polymer consisting of
      (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and
      (b) a remainder consisting essentially of an ester of acrylic acid and a $C_2$–$C_8$ monohydric alcohol, said remainder constituting at a minimum about 80 mole percent of the core reactants, and
   (2) about 90 to about 10 weight percent of an outer shell consisting essentially of the polymerization product of monomer mixtures selected from the group consisting of
      (a) about 65 to about 98 mole percent methyl methacrylate and about 35 to about 2 mole percent of an epoxy-functional acrylate and
      (b) about 2 to about 35 mole percent of an epoxy-functional acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol and 0 to 30 mole percent of a monomer selected from acrylonitrile, methacrylonitrile and vinyl acetate,
and being provided with alpha-beta, olefinic, unsaturation surface functionality by reacting at least a major portion of the resultant epoxy groups on the surfaces of said outer shell with an alpha-beta olefinically unsaturated monocarboxylic acid.

2. An article of manufacture in accordance with claim 1 wherein said alpha-beta olefinically unsaturated monocarboxylic acid is selected from acrylic and methacrylic acid.

3. An article of manufacture in accordance with claim 1 wherein said remainder constitutes about 80 to about 98 mole percent of said core and said minor and crosslinking amount constitutes about 2 to about 20 mole percent of said core.

4. A radiation-curable paint which on a pigment and particulate filler-free basis comprises a film-forming dispersion of about 30 to about 90 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 10 to about 70 weight percent of graded-rubber particles having alpha-beta olefinic-unsaturation surface functionality, said particle consisting essentially of
   (1) about 10 to about 90 weight percent of a core of crosslinked acrylic polymer consisting of
      (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and
      (b) a remainder consisting essentially of an ester of acrylic acid and a $C_2$–$C_8$ monohydric alcohol, said remainder constituting at a minimum about 80 mole percent of the core reactants, and
   (2) about 90 to about 10 weight percent of an outer shell consisting essentially of the polymerization product of monomer mixtures selected from the group consisting of
      (a) about 65 to about 98 mole percent methyl methacrylate and about 35 to about 2 mole percent of an epoxy-functional acrylate and
      (b) about 2 to about 35 mole percent of an epoxy-functional acrylate and about 65 to about 98 mole percent of a mixture consisting essentially of esters of acrylic or methacrylic acid and a $C_1$–$C_8$ monohydric alcohol, $C_8$–$C_9$ monovinyl hydrocarbons, 0 to 30 mole percent of a difunctional compound selected from divinyl benzene and diesters of acrylic or methacrylic acid and a $C_2$–$C_6$ dihydric alcohol and 0 to 30 mole percent of a monomer selected from acrylonitrile, methacrylonitrile and vinyl acetate,
and being provided with alpha-beta, olefinic, unsaturation surface functionality by reacting at least a major portion of the resultant epoxy groups on the surfaces of said outer shell with an alpha-beta olefinically unsaturated monocarboxylic acid.

5. A radiation-curable paint in accordance with claim 4 wherein said remainder constitutes about 80 to about 98 mole percent of said core and said minor and crosslinking amount is about 2 to about 20 mole percent.

6. A radiation-curable paint in accordance with claim 4 wherein said alpha-beta olefinically unsaturated monocarboxylic acid is selected from acrylic acid and methacrylic acid.

7. In a method for painting a substrate wherein a film-forming solution is applied as a paint film to a surface of said substrate and crosslinked thereon by exposing the coated surface to ionizing radiation, the improvement wherein said film-forming solution, exclusive of non-polymerizable solvents, pigments and particulate filler, comprises about 30 to about 90 weight percent vinyl monomers at least a major proportion of which are selected from esters of acrylic or methacrylic acid and a $C_1$–$C_8$ monohydric alcohol and $C_8$–$C_9$ monovinyl hydrocarbons, and about 10 to about 70 weight percent of graded-rubber particles having alpha-beta olefinic-unsaturation surface functionality, said particle consisting essentially of
   (1) about 10 to about 90 weight percent of a core of crosslinked acrylic polymer consisting of
      (a) a minor and crosslinking amount of a di- or tri-functional monomer containing 2 or more non-conjugated terminal ethylenic groups selected from divinyl benzene, a diester of acrylic or methacrylic acid and a $C_2$–$C_8$ dihydric alcohol or a triester of acrylic or methacrylic acid and a $C_2$–$C_8$ trihydric alcohol, said minor and crosslinking amount not exceeding about 20 mole percent of the core reactants and (b) a remainder consisting essentially of an ester of acrylic acid and a $C_2$-$C_8$ monohydric alcohol, said remainder constituting at a minimum about 80 mole percent of the core reactants, and (2) about 90 to about 10 weight percent of an outer shell consisting essentially of the polymerization product of monomer mixtures selected from the group consisting of (a) about 65 to about 98 mole percent methyl methacrylate and about 35 to about 2 mole percent of an epoxy-functional acrylate and (b) about 2 to about 35 mole percent of an epoxy-functional acrylate and about 65 to about 98 mole percent of a mixture consisting essentially of esters of acrylic or methacrylic acid and a $C_1$-$C_8$ monohydric alcohol, $C_8$-$C_9$ monovinyl hydrocarbons, 0 to 30 mole percent of a difunctional compound selected from divinyl benzene and diesters of acrylic or methacrylic acid and a $C_2$-$C_6$ dihydric alcohol and 0 to 30 mole percent of a monomer selected from acrylonitrile, methacrylonitrile and vinyl acetate, and being provided with alpha-beta, olefinic, unsaturation surface functionality by reacting at least a major portion of the resultant epoxy groups on the surfaces of said outer shell with an alpha-beta olefinically unsaturated monocarboxylic acid.

8. A method for painting in accordance with claim 7 wherein said remainder constitutes about 80 to about 98 mole percent and said minor and crosslinking amount is about 2 to about 20 mole percent.

9. A method in accordance with claim 7 wherein said alpha-beta olefinically unsaturated monocarboxylic acid is selected from acrylic acid and methacrylic acid.

10. A method in accordance with claim 7 wherein said graded-rubber particles have average diameter in the range of about 0.04 to 1 micron.

References Cited

UNITED STATES PATENTS

| 3,437,514 | 4/1969 | Burlant | 117—93.31 |
| 3,528,844 | 9/1970 | Burlant | 117—93.31 |
| 3,502,745 | 3/1970 | Minton | 260—881 |

PAUL LIEBERMAN, Primary Examiner

U.S. Cl. X.R.

260—836, 885

UNITED STATES PATENT OFFICE
CERTIFICATE OF CORRECTION

Patent No. 3,723,166  Dated March 27, 1973

Inventor(s) JOHNSON, OLIN B., ET. AL.

It is certified that error appears in the above-identified patent and that said Letters Patent are hereby corrected as shown below:

Column 1 in the heading, line 6, after "Heights, Mich. 48127", insert -- assignors to Ford Motor Company, Dearborn, Mich., a corporation of Del. -- .

Signed and sealed this 25th day of December 1973.

(SEAL)
Attest:

EDWARD M. FLETCHER, JR.
Attesting Officer

RENE D. TEGTMEYER
Acting Commissioner of Patents